United States Patent
Osuga et al.

[11] Patent Number: 5,886,750
[45] Date of Patent: *Mar. 23, 1999

[54] TELEVISION RECEIVER INCLUDING SHADING CORRECTION WITHOUT DETERIORATING S/N RATIO

[75] Inventors: Satoshi Osuga; Yoshihiro Inamoto, both of Saitama; Hiroaki Kikuchi, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 650,272

[22] Filed: May 22, 1996

[30] Foreign Application Priority Data

Jun. 8, 1995 [JP] Japan ................................. 7-142053

[51] Int. Cl.$^6$ ........................................... H04N 5/21
[52] U.S. Cl. .......................... 348/615; 348/673; 348/686
[58] Field of Search .................................. 348/674, 208, 348/675, 673, 687, 686, 805, 806, 807, 689, 658, 804, 320, 615, 602; 358/248, 242, 50, 237, 519; 361/91; 315/371, 381, 383; 178/5.45 SY; H04N 9/79, 5/208, 5/21

[56] References Cited

U.S. PATENT DOCUMENTS

| | | |
|---|---|---|
| 4,549,117 | 10/1985 | Takahashi et al. ...................... 315/371 |
| 4,549,216 | 10/1985 | Yuki ......................................... 358/242 |
| 4,855,864 | 8/1989 | Griffey ....................................... 361/91 |
| 5,196,937 | 3/1993 | Kageyama .............................. 358/169 |
| 5,563,652 | 10/1996 | Toba et al. .............................. 348/208 |
| 5,596,374 | 1/1997 | Sumiyoshi et al. ...................... 348/673 |
| 5,656,895 | 8/1997 | Tateishi .................................. 315/382 |
| 5,671,023 | 9/1997 | Nishiwaki et al. ...................... 348/675 |

FOREIGN PATENT DOCUMENTS

| | | | |
|---|---|---|---|
| 401018374A | 1/1989 | Japan ............................. H04N 5/208 |
| 008079789A | 3/1996 | Japan ................................. H04N 9/79 |

*Primary Examiner*—Tommy P. Chin
*Assistant Examiner*—Gims S. Philippe
*Attorney, Agent, or Firm*—Jay H. Maioli

[57] ABSTRACT

In a television receiver, shading correction is carried out without deteriorating the S/N ratio. In a television receiver including a CRT, and a shading corrector for supplying an image signal to a cathode of the CRT (cathode-ray tube) and for correcting brightness inequalities of an image formed on a fluorescent screen by way of electron beams which are increased/decreased in response to a change in the potentials applied to a first grid of the CRT, the shading corrector supplies a shading correction signal to the first grid.

2 Claims, 4 Drawing Sheets

L2: INVERTED ABL VOLTAGE

TELEVISION RECEIVER INCLUDING SHADING CORRECTION WITHOUT DETERIORATING S/N RATIO

BACKGROUND OF THE INVENTION

The present invention generally relates to an image device such as a television receiver equipped with a CRT (cathode-ray tube). More specifically, the present invention relates to a shading correction circuit of a television receiver capable of correcting brightness inequalities.

In conventional image devices, pictures are displayed on display devices. For instance, in an image-receiving tube (referred to as a "CRT" hereinafter) of a television receiver, three-color (red (R), green (G), blue (B)) electron guns are arranged in a neck portion of a funnel-shaped glass bulb, and an anode and a fluorescent screen are provided in a cone-shaped portion of this glass bulb. Electron beams emitted from the respective R, G, B-electron guns are accelerated by an anode voltage of a high voltage so as to impinge onto the fluorescent screen, so that images are displayed thereon.

An electron gun of a CRT contains a cathode for emitting electrons, and a plurality of cylindrical electrodes, namely grids for converging the electrons emitted from the cathode into an electron beam and also for accelerating the electron beam. These grids are called the first grid (G1), the second grid (G2), etc., counting from the cathode side.

The modulation of the electron beams by image signals (namely, to vary the amount of these electron beams reaching the fluorescent screen) is controlled based on the relative potential difference between the first grid and the cathode. Conventionally, a so-called "cathode-drive type system" is generally employed in which the image signals are supplied to the cathode.

Also, in a large-sized projection type television receiver, electron beams are projected from three color CRTs (called "R (R), green (G), blue (B) projection tubes") via a lens toward either a reflection-type screen or a projection-type screen, so that images are displayed on this screen. In this projection-type television receiver, the configuration of the CRTs are similar to those described above.

A description will now be made of a shading phenomenon in a television receiver.

Generally speaking, since the screens (i.e., fluorescent surfaces or screens) of television receivers are made substantially flat, the distances over which the electron beams emitted from an electron gun (or a projection tube) have to reach the screen differ between the central portion of this screen and peripheral portions thereof. As a result, a so-called "shading" phenomenon occurs even for equivalent amounts of electron beams. That is, the further the distance from the central portion of the screen to the peripheral portions thereof, the more the luminance (brightness) of the screen is lowered.

Conventionally, a shading correction circuit such as that shown in FIG. 1 is employed so as to eliminate the brightness inequalities of the fluorescent screens caused by the shading phenomenon. It should be noted that this shading correction circuit indicated in FIG. 1 is employed for each of the R, G, and B image signals.

In FIG. 1, an image signal VIN is compared with a standard voltage $V_s$ corresponding to the black level $V_I$ of the screen by a comparison amplifier (amp) 1, so that only the signal components that exceed the standard voltage $V_s$ are inputted into a multiplier 2. In the multiplier 2, the inputted image signal voltage is modulated based on a correction wave signal such as a saw-tooth wave signal or a parabolic wave signal to thereby calculate a correction voltage $V_c$.

In this case, the correction voltage $V_c$ is changed linearly from a higher brightness level of the image signals to a lower brightness level thereof. This is because even when a bright screen is properly corrected, overcorrection is made for a dark screen even at the same point on the screen.

It should be understood that the sorts of the above-described correction wave signals are determined by considering the three electron guns (projection tubes) arrangement system, and also the nature of the shading phenomenon resulting from the shape, of the fluorescent surface (or screen).

The correction voltage $V_c$ outputted from the multiplier 2 is added to the image signal voltage $V_{IN}$ by an adder 3, so that a shading-corrected image signal voltage $V_{out}$ such as that shown in FIG. 1 is obtained. This shading-corrected image signal voltage $V_{out}$ is supplied to a cathode K of a CRT 4. As a result, if the same image signal voltage $V_{IN}$ has been applied, then the brightness of the center portion of the screen is theoretically identical to that of the peripheral portion.

However, in the above-described conventional shading correcting method, the image signal voltage $V_{out}$ obtained by modulating the image signal voltage $V_{IN}$ with the correction waveform signal in the multiplier 2 is applied to the cathode of the CRT—in other words, the image signal voltage $V_{out}$ is directly modulated. Accordingly, the S/N ratio deteriorates, and the brightness of the center portion of the screen must be lowered to eliminate the difference between the brightness of the corner portions and the brightness of the center portion thereof.

SUMMARY OF THE INVENTION

As a consequence, the present invention has been made to solve the above-described problems, and therefore, has as its objective to provide a shading correction method that does not lead to a deterioration of the S/N ratio.

To solve the above-described problems, the television receiver according to the present invention is configured such that image signals are supplied to a cathode of a CRT, and shading correction signals are supplied to the above-described first grid of the CRT.

Also, in accordance with the television receiver of the present invention, the above-described shading correction signals are obtained by modulating a shading correction waveform signal such as a parabolic wave signal, with an inverted ABL voltage. Furthermore, this inverted ABL voltage is suppressed during vertical blankings.

With the above-described configuration, the electron beams emitted from the cathode according to the voltage proportional to the image signal are themselves modulated by the shading correction signal supplied to the first grid. As a result, the S/N ratio is not deteriorated by the multiplier as in the related art.

Also, since the shading correcting signal is produced by modulating the shading correcting waveform signal such as the parabolic wave signal by the brightness with employment of the inverted ABL voltage, the correction amount of the shading correction signal can be linearly varied in response to the brightness, for instance, when the brightness is high, the shading correction amount is increased, whereas when the brightness is low, the shading correction amount is decreased.

In addition, since the inverted ABL voltage is suppressed during the vertical flyback period (actually, this inverted ABL voltage is suppressed to 0), modulation is applied when the brightness is at its lowest. As a consequence, the adverse influence caused by the shading correction signal can be suppressed to a minimum with respect to the reference pulse of the cathode current.

BRIEF DESCRIPTION OF THE DRAWINGS

For a better understanding of the present invention, reference is made to a detailed description to be read in conjunction with the accompanying drawings, in which.

DETAILED DESCRIPTION OF THE PREFERRED EMBODIMENTS

Figure 1:
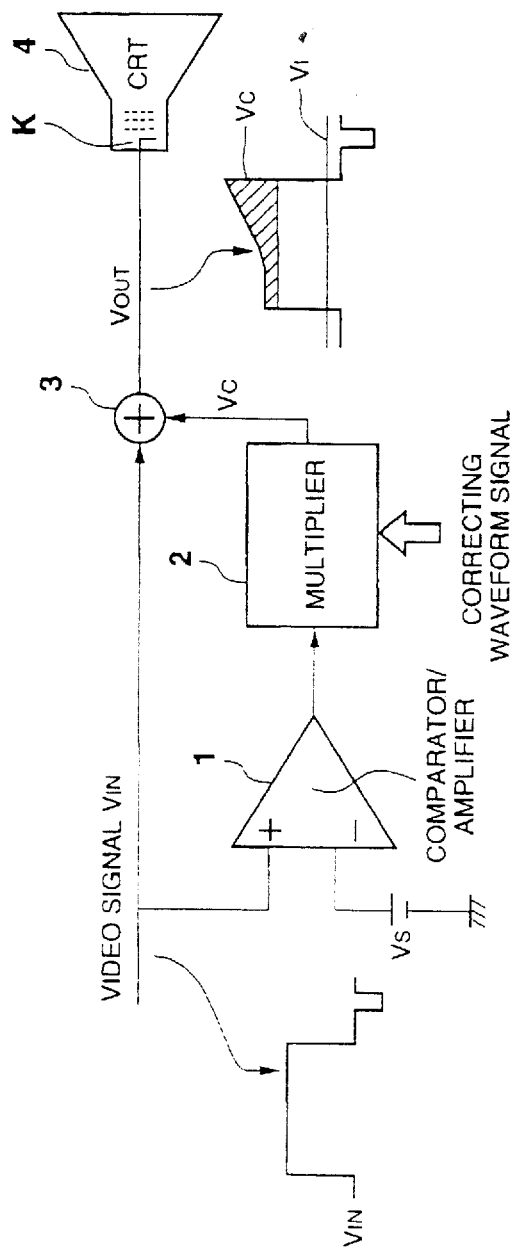
FIG. 1 schematically shows the conventional shading correction circuit.
Figure 2:
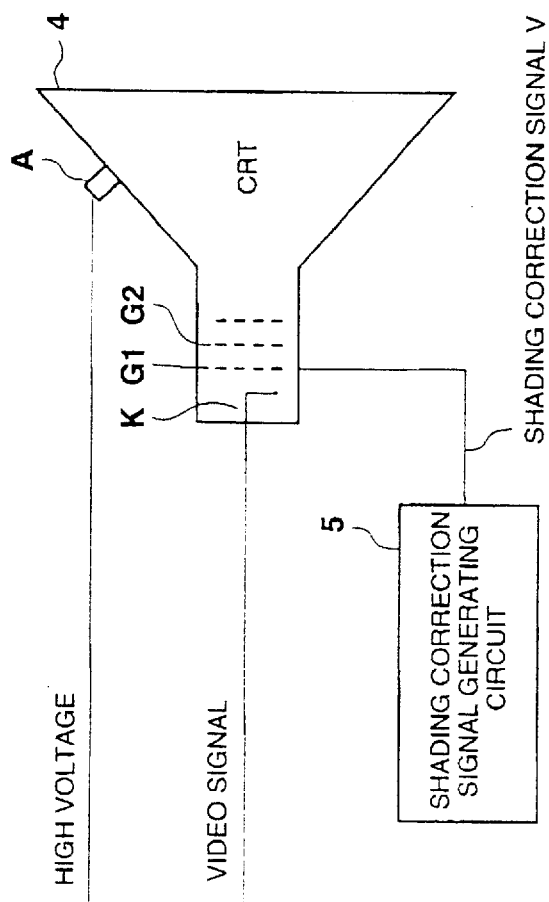
FIG. 2 schematically indicates a simplified circuit diagram for explaining a shading correcting method according to an embodiment of the present invention.
Figure 3:
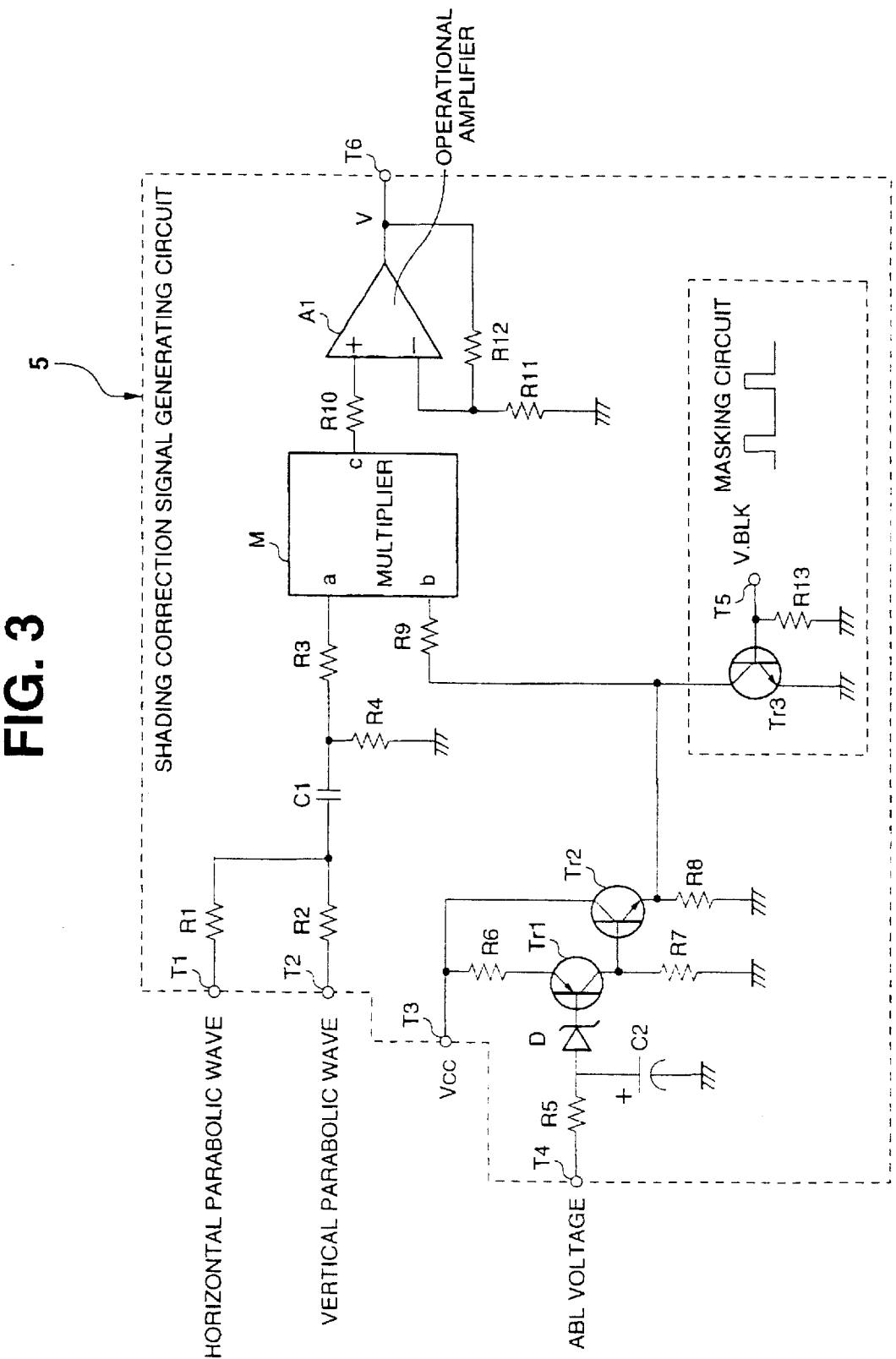
FIG. 3 is an explanatory diagram for representing in detail the shading correction signal generating circuit 5 of FIG. 2.
Figure 4:
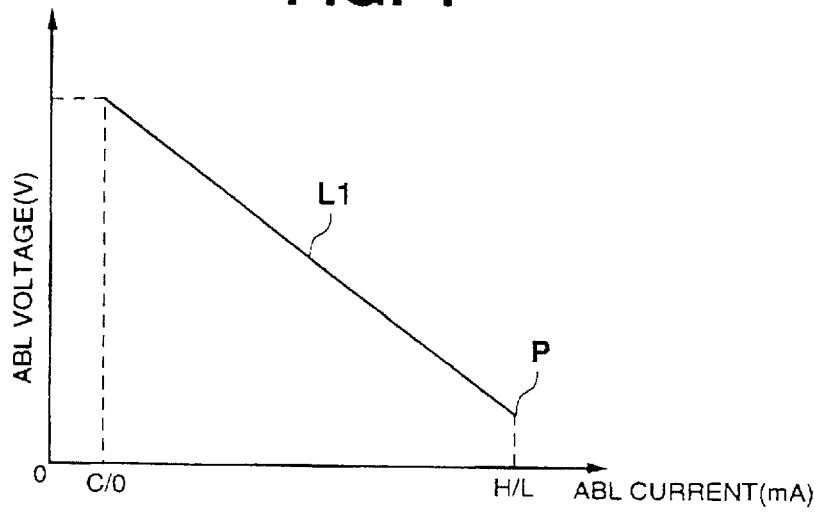
FIG. 4 is an explanatory diagram for explaining an ABL voltage.

Referring now to FIG. 2 to FIG. 4, a television receiver with a shading correcting method according to an embodiment of the present invention will be described. It should be noted that the same reference numerals shown in the conventional shading correction circuit of FIG. 1 will be employed as those for denoting the same or similar circuit elements in the following drawings.

FIG. 2 indicates a major portion of a television receiver configured in accordance with a shading correcting method of the present invention.

In FIG. 2, image signals are supplied to the cathode K of the CRT 4, whereas a shading correction signal V generated with a shading correction signal generating circuit 5 is supplied to a first grid Gi of the CRT 4. A high voltage is applied to the anode A of the CRT 4.

Since the voltage of the anode A is constant, if the amount of electron beams emitted from the cathode K—namely the magnitude of the image signal voltage—is constant, then brightness on the display screen is controlled by the voltage at the first grid, namely, by the shading correction signal V.

Although a parabolic wave signal may be directly used as this shading correction signal V, it is so arranged in this embodiment that the shading correction amount is not adversely influenced by changes in the magnitude of the image signal voltages. In other words, as shown in FIG. 3, this shading correction signal V is generated by employing the shading correction signal generating circuit 5.

As illustrated in FIG. 3, the shading correction signal generating circuit 5 includes input terminals T1 to T5, an output terminal T6, a multiplier M, an operational amplifier A1, resistors R1 to R13, capacitors C1 and C2, transistors Tr1, Tr2, and Tr3, and a zener diode D.

A horizontal parabolic wave signal having the shading correction wave signal is inputted into the input terminal T1, and a vertical parabolic wave signal having the shading correction wave signal is inputted into the input terminal T2. The reason why these parabolic wave signals are used is described below.

The distances over which the electron beams reach the screen are changed in parabolic forms along both the horizontal direction and the vertical direction together with the movement of the beam from the center portion of the screen to the peripheral portion thereof. As a result, a shading phenomenon will occur in the horizontal direction and the vertical direction. Therefore, the respective shading phenomena along the horizontal direction and the vertical direction are corrected based upon the horizontal and vertical parabolic wave signals. It should be understood that the frequency of the horizontal parabolic wave signal is equal to the horizontal scanning frequency of the electron beam, and the frequency of the vertical parabolic wave signal is equal to the vertical scanning frequency of the electron beam.

In other words, the shading correction amount with respect to a certain electronic beam spot located at a coordinate point (X, Y) on the screen is equal to a value of combining the voltage of the horizontal parabolic wave signal corresponding to the coordinate X and the voltage of the vertical parabolic wave signal corresponding to the coordinate Y.

Furthermore, the input terminals T1 and T2 are connected via the resistors R1 and R2, respectively, to one end of the coupling capacitor C1. The other end of the coupling capacitor C1 is connected via the resistor R3 to one input terminal "a" of the multiplier M, and is also grounded via the resistor R4.

As a consequence, the combined wave signal of the horizontal parabolic wave signal and the vertical parabolic wave signal is inputted to one input terminal "a" of the multiplier M.

A power supply voltage $V_{cc}$ (for instance, +12V) of the transistors Tr1 and Tr2 is inputted to the input terminal T3.

An ABL voltage is inputted to the input terminal T4. As this ABL voltage, an output voltage of an ABL circuit (automatic brightness limiting circuit), not shown in FIG. 3, is employed. As is known in the art, this ABL circuit is a circuit for detecting a current (called an "ABL current") proportional to the brightness of the image-receiving tube, and for feeding back this ABL current to a cathode voltage, thereby limiting the brightness to a preselected value.

As indicated by the straight line L1 of FIG. 4, this ABL voltage is varied in a linear manner in accordance with the ABL current. In this drawing, "C/O" indicates a zero value of brightness, namely, the cut-off point. "H/L" shows a maximum value of brightness, namely, the highlight point. A point "P" represents such an operation point where the ABL circuit is operated and the brightness of the highlight is limited to a constant value.

Returning to FIG. 3, the input terminal T4 is connected via a smoothing circuit constructed of the resistor R5 and the capacitor C2, and also via the Zener diode D used as a constant (Zener diode) voltage limiter to a base of the transistor Tr1. An emitter of the transistor Tr1 is connected via the resistor R6 to the power supply input terminal T3. Also, a collector of this transistor Tr1 is connected via a resistor R7 to the ground.

Figure 5:
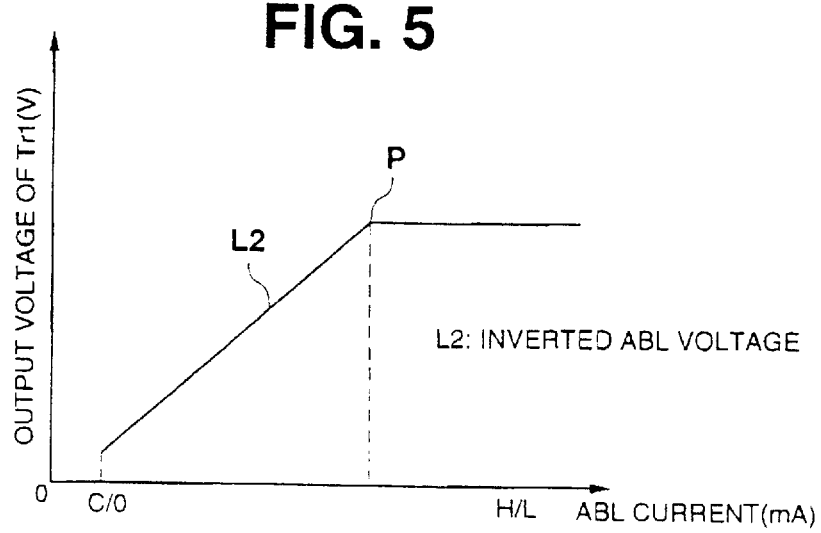
FIG. 5 is an explanatory diagram for explaining the output voltage of the transistor Tr1 shown in FIG. 3.

With the above-described connections, the transistor Tr1 may function as an inversion amplifier. That is, a voltage (called an "inverted ABL voltage") such as that indicated by the straight line L2 of FIG. 5 appears between the collector and the ground (across the resistor R7). As apparent from the straight line L2, this inverted ABL voltage is increased linerally from the cut-off (C/O), and then becomes a constant value at the operating point "P" where the ABL circuit is operated to maintain the brightness of the highlight (H/L) at the limit value.

Returning to FIG. 3, the transistor Tr2 is an impedance converting transistor whose emitter is connected via the resistor R8 to the ground, and also via the resistor R9 to the other input terminal "b", of the multiplier M. A collector of this transistor Tr2 is connected to the power supply input terminal T3. With the employment of such a connection, the inverted ABL voltage is inputted to this input terminal "b", of the multiplier M.

The multiplier M modulates the combined wave signal produced from the horizontal parabolic wave signal and the vertical parabolic wave signal, which are inputted into the input terminal "a", by the inverted ABL voltage inputted into the input terminal "b". As a result, the multiplier M outputs from output terminal "c" the obtained waveform signal as the shading correction signal. As a result, the correction amount of the shading correction signal outputted from the multiplier M, which corresponds to the electron beam spot of the coordinate (X, Y), may be expressed by a vector summation of the voltage of the parabolic wave signal at the coordinate (X, Y), and the brightness level of the image signal at this point (X, Y).

The output terminal "c" of the multiplier M is connected via the resistor RIO to a plus terminal of the operational amplifier A1. A minus terminal of the operational amplifier Al is connected via the resistor R11 to the ground, and also via the resistor R12 to the output terminal of the operational amplifier A1. With the employment of the above-described connections, the operational amplifier Al possesses the function of adjusting the magnitude of the shading correction signal.

The output terminal of the operational amplifier Al is connected to the output terminal T6 of the shading correction signal generating circuit 5, and also to the first grid of the CRT 4 (see FIG. 2). As a consequence, the above-described shading correction signal V is supplied from the output terminal T6 to the first grid G1 of the CRT 4.

Next, a description will now be made of a masking circuit which constitutes one of the features of the present invention.

In FIG. 3, the input terminal "b" of the multiplier M (namely, the emitter side of the transistor Tr2) is connected to a collector of the transistor Tr3. An emitter of, this transistor Tr3 is grounded. A base of this transistor Tr3 is connected to an input terminal T5 to which a vertical blanking pulse signal V.BLK, as shown in FIG. 3, is inputted.

With the employment of the above-described connections, when the vertical masking pulse signal V.BLK is inputted to a transistor Tr3, this transistor Tr3 is brought into a conductive condition, so that the potential at the input terminal "b" of the multiplier M falls to the ground potential. As a consequence, the parabolic wave signals are modulated during the vertical flyback period in the case of minimum brightness.

In other words, when the reference pulse of the cathode current of the CRT 4 is present within the vertical flyback period of the image signal, the transistor Tr3 may function as a masking circuit for reducing the adverse influences of the shading correction signal V with respect to this reference pulse.

As previously described in detail, with the shading correction method according to this invention, since the shading correction signal is applied to the first grid of the CRT, it is not necessary to modulate the image signal itself, contrary to the conventional shading correction circuit. Accordingly, uniform image quality can be achieved without deterioration of the S/N ratio, and the image quality of the television receiver is improved.

Moreover, since the image signal is not directly modulated, it is possible to realize uniform brightness from a dark screen to a light screen without lowering the brightness of the screen center.

What is claimed is:

1. A television receiver, comprising:

image signal generating means for producing electron beams by supplying an image signal voltage directly to a cathode of a substantially flat screen cathode ray tube;

brightness level detecting means for determining an input brightness of said image signal based upon an automatic brightness limiting (ABL) signal and for producing an inverted ABL voltage;

parabolic signal combining means for producing a shading correction waveform by combining a horizontal parabolic wave signal and a vertical parabolic wave signal; and shading correction means for correcting brightness inequalities of an image formed on a fluorescent screen due to the screen flatness of said cathode ray tube by modulating said electron beams by varying a potential supplied to a first grid of said cathode ray tube in response to signals obtained by multiplying said inverted ABL voltage produced by said brightness level detecting means with said shading correction waveform produced by said parabolic signal combining means.

2. The television receiver as claimed in claim 1, further comprising means for suppressing said inverted ABL voltage during a vertical flyback period and wherein said shading correction means turns off said potential supplied to said first grid in response to said suppressed inverted ABL voltage.

* * * * *